US012671601B2

(12) United States Patent
Tjanaka et al.

(10) Patent No.: US 12,671,601 B2
(45) Date of Patent: Jun. 30, 2026

---

(54) PSEUDO LOAD SHARING FOR POWER OVER ETHERNET APPLICATIONS

(71) Applicant: ARISTA NETWORKS, INC., Santa Clara, CA (US)

(72) Inventors: Willy Tjanaka, Santa Clara, CA (US); Eudean Michael Sun, Walnut Creek, CA (US); Eric Yam, San Jose, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 151 days.

(21) Appl. No.: 18/326,794

(22) Filed: May 31, 2023

(65) Prior Publication Data

US 2024/0406014 A1 Dec. 5, 2024

(51) Int. Cl.
*H04L 12/10* (2006.01)
*H04L 12/40* (2006.01)
*H04L 12/46* (2006.01)

(52) U.S. Cl.
CPC ........ *H04L 12/10* (2013.01); *H04L 12/40045* (2013.01); *H04L 12/4633* (2013.01)

(58) Field of Classification Search
None
See application file for complete search history.

(56) References Cited

U.S. PATENT DOCUMENTS

| | | | | | |
|---|---|---|---|---|---|
| 7,893,560 | B2 * | 2/2011 | Carter | ..................... | H02J 9/061 |
| | | | | | 307/64 |
| 10,261,571 | B2 * | 4/2019 | Hance | ....................... | G06F 1/28 |

| | | | | |
|---|---|---|---|---|
| 2006/0117089 | A1 | 6/2006 | Karam | |
| 2014/0129850 | A1 | 5/2014 | Paul | |
| 2016/0013654 | A1 * | 1/2016 | Saha ........................ | H02J 1/14 |
| | | | | 307/29 |
| 2017/0203850 | A1 * | 7/2017 | Wang ........................ | H02J 7/34 |
| 2019/0179389 | A1 | 6/2019 | Frick et al. | |
| 2020/0324719 | A1 | 10/2020 | Mahmoud et al. | |

OTHER PUBLICATIONS

European Search Report issued by the European Patent Office (EPO) for European Patent Application No. 24179256.3, mailed Oct. 14, 2024, 9 pages.
Office Action issued by the European Patent Office (EPO) for European Patent Application No. 24179256.3, mailed Mar. 27, 2026, 6 pages.

* cited by examiner

*Primary Examiner* — Fahmida Rahman
(74) *Attorney, Agent, or Firm* — Sprinkle IP Law Group

(57) ABSTRACT

A network device providing pseudo load sharing capabilities using low-cost power supplies that do not have active load sharing. Each of the power supplies is connected to a corresponding power rail that delivers power to a corresponding subgroup of the PoE ports of the network device. A switchable link is connected between the power rails and is controlled based on the power outputs of the power supplies. If both power supplies are providing output power at acceptable voltages, a switch component of the switchable link remains open, so that each power supply delivers power to its own separate subgroup of the PoE ports. If the output voltage of one of the power supplies falls below a threshold voltage, a switch component of the switchable link is closed to electrically connect the two power rails, allowing PoE ports of both subgroups to draw power from the remaining power supply.

12 Claims, 6 Drawing Sheets

FIG. 6A
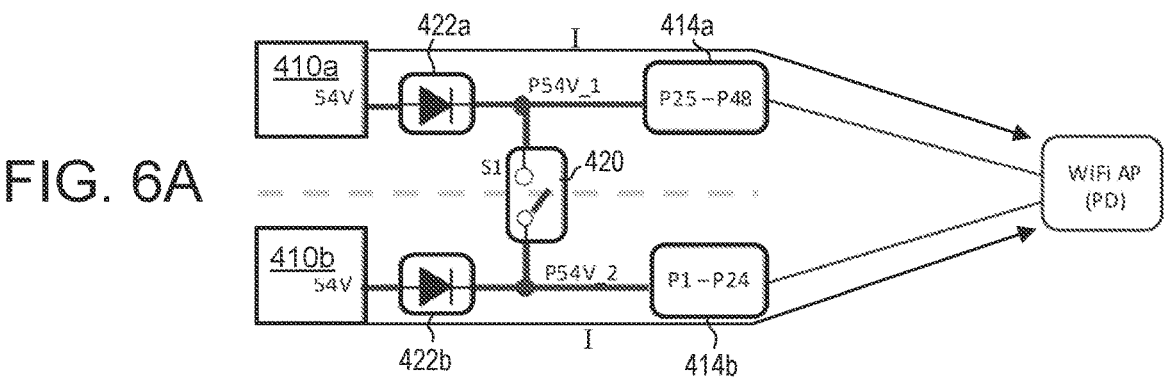
FIG. 6B
FIG. 6C
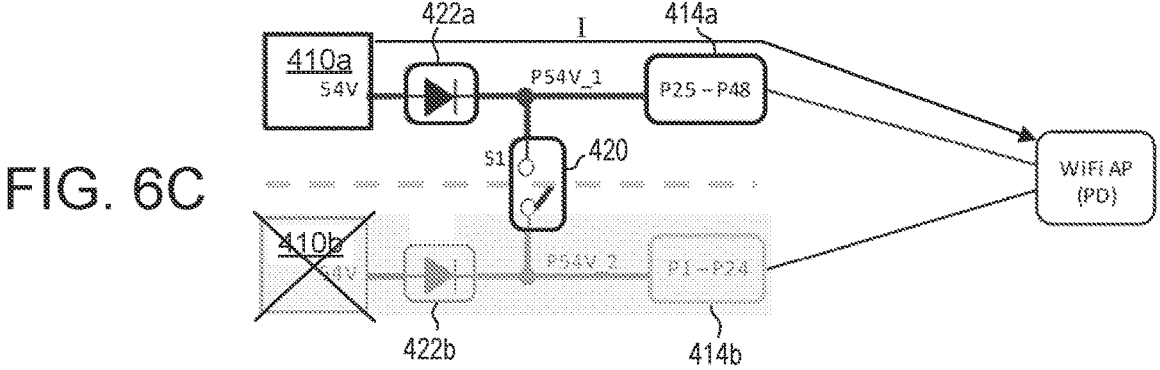

PSEUDO LOAD SHARING FOR POWER OVER ETHERNET APPLICATIONS

TECHNICAL FIELD

The disclosed embodiments relate generally to providing power to devices from multiple power supplies, and more specifically to achieving load sharing and redundancy capabilities in devices that use multiple power supplies to provide power through Power over Ethernet (PoE) ports.

BACKGROUND

Some network devices provide power to external devices through PoE ports. There are a number of related factors that are taken into consideration when designing a network device which includes PoE ports. These factors include, for example, the maximum power that can be provided to the PoE ports, the availability of power at the PoE ports (the reliability of the device in providing power through the PoE ports), the cost of required power supplies, and the ability to load-share between power supplies.

In order to maximize power provided to the PoE ports, a network device may use multiple power supplies. When power is provided by multiple power supplies, the power supplies may be used in a way that provides benefits other than just increased power. For instance, the power supplies may be configured to provide redundancy, or to share the electrical load so that PoE ports can draw power from more than one of the power supplies.

Conventionally, if the power delivered to a common group of PoE ports is delivered by multiple power supplies, implementing load sharing requires implementation of an active load sharing scheme. Active load sharing features are normally provided by building these features into the power supplies, which increases the complexity and cost of the power supplies. The increased cost of load-sharing-capable power supplies may make it impractical to include these power supplies in a network device.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features.

FIGS. 6A-6C are diagrams illustrating different failure scenarios for power supplies of a pseudo load sharing system in a split plane power mode in accordance with some embodiments.

DETAILED DESCRIPTION

Figure 1:
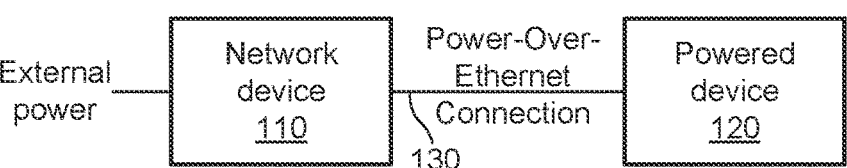
FIG. 1 is a diagram illustrating the structure of a system for providing power to a device through an output port of the system in accordance with some embodiments.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the embodiments in detail. It should be understood, however, that the detailed description and the specific examples are given by way of illustration only and not by way of limitation. Various substitutions, modifications, additions and/or rearrangements within the spirit and/or scope of the underlying inventive concept will become apparent to those skilled in the art from this disclosure.

It would be desirable to provide systems and methods for achieving the purposes of load sharing power supplies in a network device, but without requiring the use of expensive specialized power supplies that have active load sharing capabilities.

Embodiments disclosed herein provide pseudo load sharing capabilities in a network device. Pseudo load sharing makes use of low-cost power supplies that do not have active load sharing features and are therefore much less expensive than power supplies that provide active load sharing. Each of the power supplies is connected directly to a corresponding power rail that delivers power to a corresponding subgroup of the PoE ports of the network device. A switchable link is connected between the power rails and is controlled based on the power outputs of the power supplies. If both power supplies are providing output power at acceptable voltages, a switch component of the switchable link remains open, so that each power supply delivers power to its own separate subgroup of the PoE ports. If the output voltage of one of the power supplies falls below a threshold voltage, a switch component of the switchable link is closed. This electrically connects (shorts) the two power rails, so that the PoE ports of both subgroups draw power from the remaining power supply, which is still delivering power at an acceptable voltage (a voltage at or above the threshold).

For the purposes of this disclosure, the term "connected" includes both direct and indirect connections between components unless either a direct connection or an indirect connection is specifically described.

The switchable link may be configurable in some embodiments to a split power plane mode. In this mode, the switchable link keeps the power rails electrically isolated from each other in order to provide separate, split power planes so that a device such as a wireless access point can be connected separately to each of the power planes through corresponding ones of the PoE ports. The network device may also include a power management module which is connected to the PoE ports and is configured to control the ports so that only selected ones receive power from the power supplies. This may be desirable to prevent too many of the PoE ports from drawing power from the remaining power supply when the other power supply has failed, as this could overload the remaining power supply.

It should be noted that some embodiments may be implemented in devices other than a network device. Additionally, some embodiments may provide power to external devices through power ports other than PoE ports. While such embodiments are possible and are within the scope of this disclosure, the specific examples provided below will focus on implementations in network devices that provide power through PoE ports.

Referring to FIG. 1, a diagram illustrating the structure of a simple system that provides power to a second device through an output port of a first device is shown. In this example, the first device 110 is a network device (e.g., a switch) which is configured to be connected to an external powered device 120 (e.g., a wireless access point) through an Ethernet link 130. (The external devices referred to herein will be the devices receiving power through the ports of the network device.) More specifically, the Ethernet link is a PoE link which is configured to enable communication between the two devices, and also to enable power to be provided from the first device (the network device) to the second device (the external device) via the PoE link.

In this system, network device 110 receives power from an external power source. Network device 110 includes internal components (i.e., a power supply) which are configured to process the received external power and to provide power with appropriate characteristics to enable operation of other components internal to the network device. Additionally, the processed power from the power supply is provided to one or more ports (PoE ports in this example) to which external devices can be connected. External devices such as second device 120 are connected to these ports via corresponding links (PoE links in this example). Since power is provided to the external devices through powered links, it is not necessary for the external devices to directly receive power from an external power source, so only one cable is necessary to carry both data and power.

Figure 2:
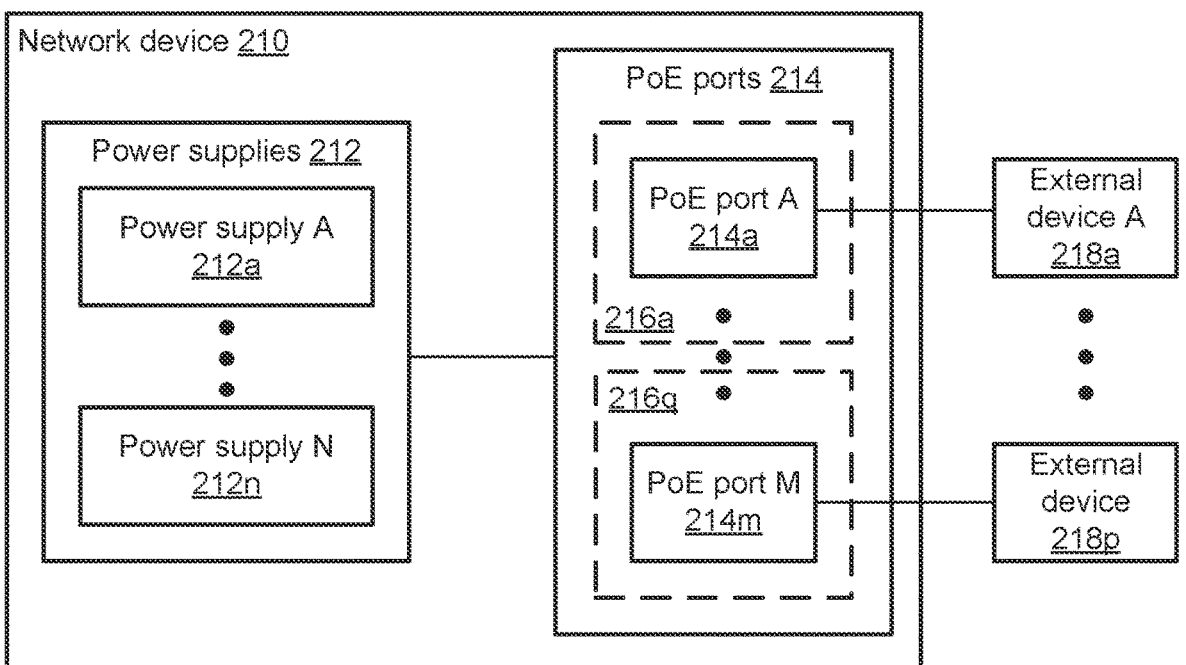
FIG. 2 is a diagram illustrating the structure of a network device having multiple power supplies in accordance with some embodiments.

Referring to FIG. 2, a diagram illustrating the structure of a network device having multiple power supplies is shown. In this example, network device 210 includes multiple power supplies 212a-212n (collectively 212). Network device 210 also includes multiple ports 214a-214m (collectively 214). It should be noted that the number (m) of PoE ports need not be the same as the number (n) of power supplies (i.e., there is not a 1:1 relationship between the power supplies and the PoE ports). Each of PoE ports 214 may have a corresponding one of external devices 218a-218p connected to it so that the external device receives power through the connection to the PoE port. The number (p) of external devices may be different than the number (m) of PoE ports and may be as few as a single device, or as many as m devices.

It should be noted that different instances of the same or similar devices may be identified herein by a common reference number followed by a letter. For instance, as depicted in FIG. 2, this system includes power supplies 212a-212n. The individual power supplies may be referred to collectively by the number alone (e.g., power supplies 212).

Each of power supplies 212 is connected to a set 216 of PoE ports 214. For example, power supply 212a may be connected to a group 216a of PoE ports, power supply 212b may be connected to a group 216b of PoE ports, and so on. Each set 216 may include one or more of the PoE ports. Typically, the number of power supplies and the number of PoE port groups is the same, and there is a 1:1 correspondence between power supplies and PoE port groups.

As noted above, the purpose of having multiple power supplies is not only to provide additional power that can be supplied through the PoE ports, but also to enable the power from the different power supplies to be shared among the PoE ports in the event that one or more of the power supplies cannot provide power at a desired voltage. It is therefore desirable to provide some means of load sharing or pseudo load sharing (PLS) in the network device to allow power from each power supply to be shared with additional PoE port groups If necessary.

Figure 3:
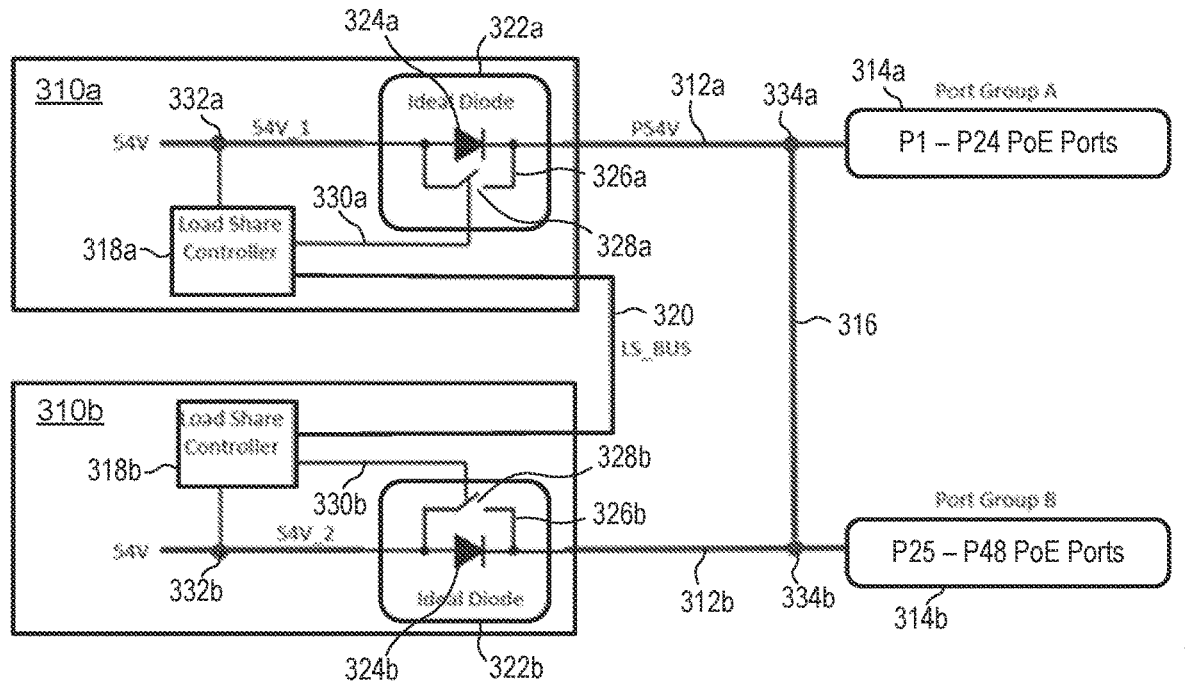
FIG. 3 is a diagram illustrating a circuit diagram illustrating the structure of a conventional active load sharing system in a network device in accordance with the prior art.

Referring to FIG. 3, a circuit diagram illustrating the structure of a conventional active load sharing system in a network device is shown. In this example, the network device includes two power supplies 310 that provide power via corresponding power rails 312 to two sets of PoE ports (314a, which includes PoE ports P1-P24, and 314b, which includes PoE ports P25-P48). Power rails 312a and 312b are shorted together by link 316. Each of PoE ports enables the connection of an external device to the network device, where the external device can draw power through the corresponding PoE port.

Because power rails 312a and 312b are shorted together, power is provided by each of power supplies 310 to each of PoE port groups 314. Each of power supplies 310 includes a load share controller 318. Both of load share controllers 318 are connected to a load share bus 320 so that the two load share controllers can communicate with each other. Load share controllers 318 are configured to control the respective power supplies so that each of the power supplies delivers the same current to the PoE port groups 314. By balancing the power delivery from each of power supplies 310 to PoE port groups 314, load share controllers 318 balance the distribution of the combined load of the PoE port groups between the power supplies and maximize the total power delivery from the power supplies.

Load share controllers 318 also serve to manage delivery power when one of the power supplies fails. For the purposes of this disclosure, "failure" may be construed as failure to deliver output power at a desired voltage. For example, if the power supplies are designed to provide output power at 54 volts, a power supply may be considered to have failed if it provides output power at a voltage less than a minimum acceptable threshold (e.g., 51 volts). The minimum acceptable output voltage may vary from one embodiment to another, and it may be configurable in some embodiments by a user.

In the embodiment of FIG. 3, each power supply includes an ideal diode circuit 322 which is positioned between an internal node 332 of the power supply and the output node 334 of the power supply. The ideal diode circuit 322 in this example includes a diode 324 and a switch 328. Load share controller 318 is connected to switch 328 by link 330. Load share controller 318 is configured to either open switch 328 to allow diode 324 to control the flow of current through ideal diode circuit 322, or in some circumstances close switch 328 so that diode 324 is bypassed.

When the voltage at node 332 is at an acceptable level (i.e., at or above the minimum voltage threshold) and switch 328 is open, current flows through diode 324 to output node 334. Because there is a voltage drop across diode 324, it may be desirable to close switch 328 so that current can flow through bypass path 326, thereby avoiding diode 324 and eliminating the voltage drop across the diode. This allows more power to be provided to the PoE ports. When the voltage output by one power supply at node 332 is below the acceptable level (i.e., below the minimum voltage threshold) and the voltage output by the other power supply is at an acceptable level (i.e., at or above the threshold voltage), there is a voltage drop from output node 334 to internal note 332, so that current will try to flow in a reverse direction (from power rail 312 to power supply 310). In this situation, load share controller 318 opens switch 328 so that current cannot flow through bypass path 326. Diode 324 then prevents the reverse flow of current through the diode.

Although the system of FIG. 3 is effective to achieve the purposes of increased power provided to the PoE ports, redundancy and load sharing, this system requires that the power supplies incorporate active load sharing features. As noted above, the incorporation of the active load sharing features in these power supplies makes them more complex and more expensive than power supplies that do not incorporate these features. It would be desirable to provide similar capabilities with the respect to increased power, redundancy and load sharing without the need to use expensive power supplies with active load sharing features.

Embodiments disclosed herein provide capabilities similar to those of the system of FIG. 3, but use low cost power supplies that do not incorporate active load sharing features. An example system is illustrated in FIG. 4.

Figure 4:
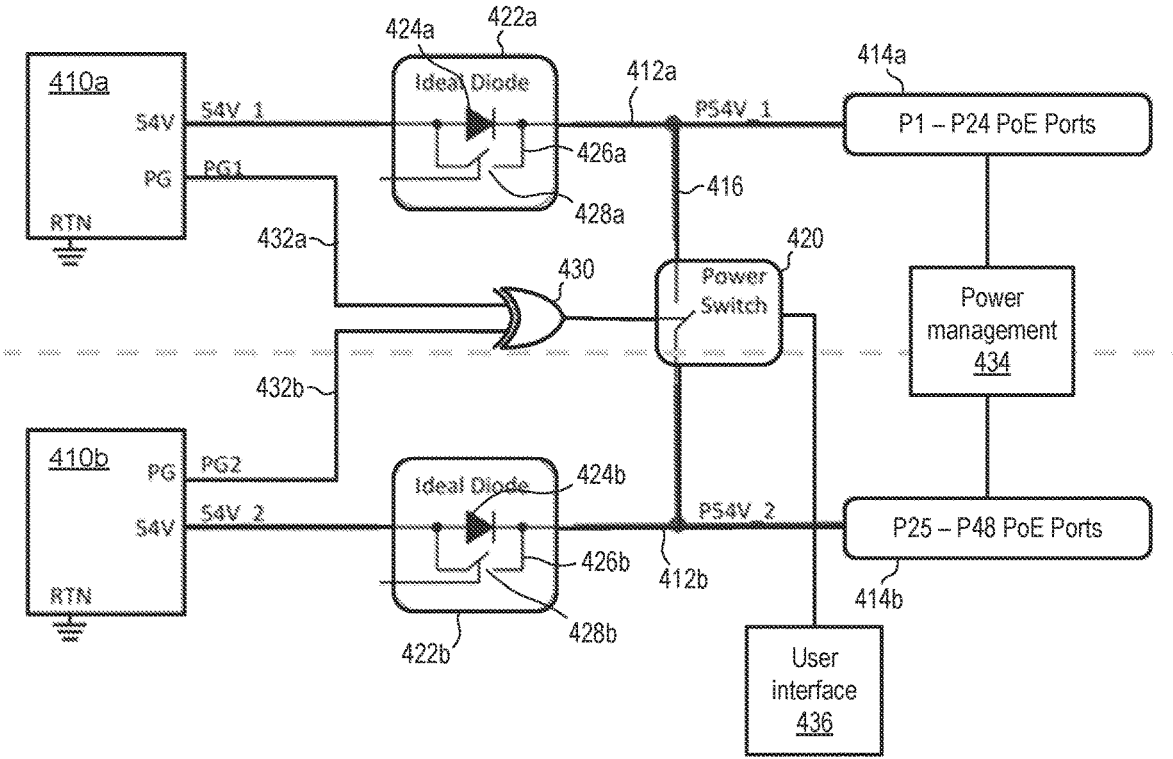
FIG. 4 is a diagram illustrating a circuit diagram illustrating the structure of a pseudo load sharing system in a network device in accordance with some embodiments.

The system of FIG. 4 is similar to the system of FIG. 3 in a number of ways. For example, both systems include two power supplies which provide power through corresponding ideal diode circuits to a power rail. Each power rail is connected to a corresponding group of PoE ports, and devices connected to the PoE ports in the group draw power through the power rail.

The systems of FIGS. 3 and 4 are, however, significantly different in a number of ways. For example, where the system of FIG. 3 uses power supplies that incorporate active load sharing features, the power supplies of FIG. 4 use simple, low cost power supplies that do not incorporate active load sharing features. As will be explained in more detail below, the system of FIG. 4 implements pseudo load sharing using components that are external to the power supplies. These components include, for instance, a switchable link that is controlled by exclusive or (XOR) circuitry based on signals from the power supplies to alternately connect or disconnect the two different power rails.

Referring to FIG. 4, each power supply 410 is connected to a corresponding ideal diode circuit 422. Ideal diode circuit 422 includes a diode 424 and a switchable bypass path 426. Diode 424 allows current to flow forward from power supply 410 to power rail 412 and prevents the reverse flow of current from the power rail back to the power supply. When power supply 410 is producing power at a desired level (i.e., at or above a threshold voltage), and assuming that one or more of the PoE ports in corresponding PoE port group 414 are powered on, current will flow forward through diode 424.

Since there is a voltage drop across diode 424, more power can be provided to the PoE ports if the current bypasses diode 424 and consequently avoids the voltage drop of the diode. Ideal diode circuit 422 therefore includes a bypass path 426, which includes a switch 428. Switch 428 can be controlled so that it is closed when the voltage generated by power supply 410 is at or above the threshold voltage. When the voltage generated by power supply 410 is below the threshold voltage, switch 428 is opened so that current cannot flow in a reverse direction through bypass path 426. Normal operation of diode 424 prevents reverse flow of current through the diode so that there is no reverse flow through the part of ideal diode circuit 422 as well.

A switchable link 416 is connected between the two power rails (412a, 412b). Switchable link 416 includes a switch 420 that can be controlled to alternately actuate the switch between an open position and a closed position. When switch 420 is open, power rail 412a is electrically disconnected from power rail 412b. When switch 420 is closed, power rail 412a is electrically connected (shorted) to power rail 412b.

Switch 420 is controlled by the output of XOR gate 430. XOR gate 430 produces this output in dependence on inputs which are connected to the respective power supplies 410. Each power supply 410 generates a "power good" (PG) signal which indicates whether or not the power produced by the power supply is "good" (i.e., the power supply produces a voltage at or above a desired threshold). For instance, if the power supply is designed to generate power at 54 volts, the output of the power supply may be deemed "good" if the generated power is at or above a threshold of 51 volts. Thus, if the output power generated by the power supply is at or above 51 volts, the PG signal is positive (indicating a binary "1"). If, on the other hand, the output power generated by the power supply is below 51 volts, the PG signal is negative (indicating a binary "0").

It should be noted that the threshold voltage may be set at any appropriate level and may be higher or lower than the foregoing example of 51 volts for a power supply designed to provide power at 54 volts. In some embodiments, the threshold voltage may be user configurable.

The PG signal from each of power supplies 410 is provided via a corresponding line 432 as an input to XOR gate 430. The output of XOR gate 430 is applied to switch 420. When both of the power supplies are generating power at a voltage which is "good" (i.e., at or above the threshold voltage), the PG signals from both of the power supplies are high. As a result, the output of XOR gate 430 is low (binary "0"). In this system, the low output signal controls switch 420 to open, so that power rail 412a is electrically disconnected from power rail 412b.

When one of power supplies 410 generates power at a voltage which is not good (i.e., the voltage is below the threshold voltage), the corresponding PG signal is low (binary "0"). If the other power supply is generating power at a "good" voltage, the PG signal generated by this power supply is high (binary "1"), so XOR gate 430 will receive a "1" and a "0", causing the XOR gate to generate a "1". The "1" generated by XOR gate 430 will control switch 420 to close. When switch 420 is closed, power rail 412a is electrically connected to power rail 412b.

When both of power supplies 410 generate power at voltages which are not "good", each of the power supplies will generate a corresponding PG signal which is low (binary "0"). These signals are applied to the inputs of XOR gate 430, which will cause the XOR gate to generate a "0". This signal is applied to power switch 420, causing it to open, so that power rail 412a is disconnected from power rail 412b.

Figures 5A, 5B, 5C:
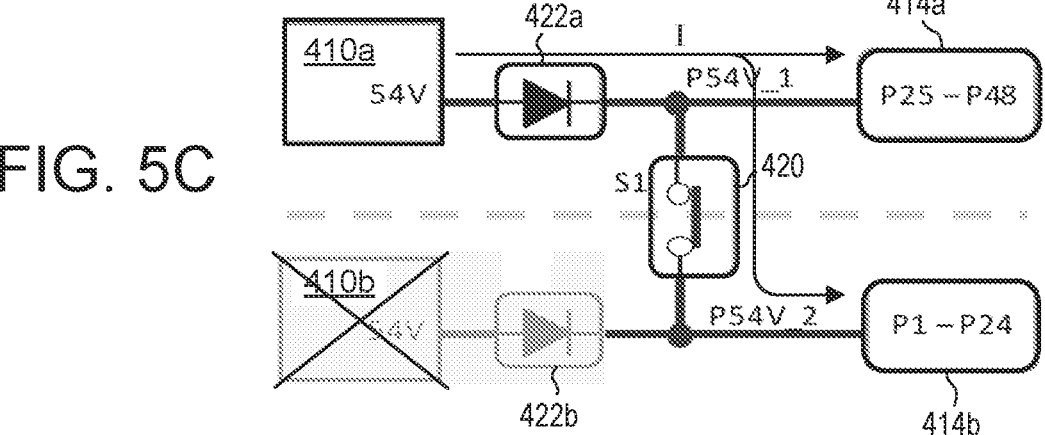
FIGS. 5A-5C are diagrams illustrating different failure scenarios for power supplies of a system in a pseudo load sharing mode in accordance with some embodiments.

Referring to FIGS. 5A-5C, a set of diagrams illustrating the operation of the pseudo load sharing system of FIG. 4 is shown. FIG. 5A illustrates a scenario in which both power supplies are generating power at an acceptable voltage, FIG. 5B illustrates a scenario in which the first one of the power supplies has failed, and FIG. 5C illustrates a scenario in which the second one of the power supplies has failed.

The failure of both power supplies is not shown in the figures because, in this situation, neither power supply can provide power at the necessary voltage necessary to power devices connected to the PoE ports.

Referring to FIG. 5A, the normal operation of the system is illustrated. In other words, each of the power supplies is operating normally and generating power at a voltage which is at or above a designated threshold voltage. Since each power supply is generating the required voltage, each power supply's PG signal shows that the output is "good." The XOR gate therefore controls the switch of the switched link to keep the switch open, and the respective power rails are electrically disconnected from each other.

As a result, the power generated by power supply 410a is applied to power rail 412a, and devices connected to the PoE ports in group 414a (and only these devices) can draw current from power supply 410a. Likewise, the power generated by power supply 410b is applied to power rail 412b, and devices connected to the PoE ports in group 414b (and only these devices) can draw current from power supply 410b.

Referring to FIG. 5B, a scenario is illustrated in which power supply 410a has failed. As noted above, "failure" is not limited to the power supply failing entirely (i.e., producing no output power whatsoever), but includes circumstances in which the output voltage falls below a threshold level.

When power supply 410a fails, the power supply generates a PG signal indicating that the power supply has failed. This signal is provided to XOR gate 430, which controls switch 420 to close, shorting power rail 412a to power rail 412b. Switch 428a is also opened so that diode 424a is not bypassed.

Because switch 420 is closed, the voltage at power rail 412a is the same as the voltage at power rail 412b, which is at the "good" voltage (i.e., voltage at or above the threshold voltage) generated by power supply 410b. Although the voltage at power rail 412a is higher than the voltage of power supply 410a, ideal diode circuit 422 prevents current from flowing from the power rail to the power supply. Power from power supply 410b is, however, provided to all of the PoE ports (in both groups 414b and 414a).

Because power supply 410b is now providing power to all of the PoE ports, there is a possibility that this power supply may be overloaded by the extra devices that may be drawing power from the power supply. The network device may therefore include a power management subsystem 434 which is connected to the PoE ports and is configured to control which of the PoE ports are enabled to draw power from the power supply. In other words, power management subsystem 434 can turn off the PoE capability of one or more of the PoE ports in order to eliminate the load of these devices from the power supply.

Referring to FIG. 5C, a scenario is illustrated in which power supply 410b has failed. This scenario is symmetric to the scenario in FIG. 5B, in the "a" and "b" components of the system are reversed. In other words, power supply 410a and power supply 410b are reversed, ideal diode circuits 412a and 412b are reversed, and so on.

In this scenario, XOR gate 430 receives a "good" PG signal from power supply 410a and a "bad" PG signal from power supply 410b, causing it to control switch 420 so that the switch closes. This electrically connects power rail 412b to power rail 412a. The "bad" PG signal from power supply 410b also causes switch 428b of ideal diode circuit 422b to open, so that current cannot flow in the reverse direction from power rail 412b to power supply 410b.

Because the power rails are shorted together, power supply 410a provides power to both of PoE port groups 414a and 414b. Only half as much power is now available to the PoE ports, so one or more of the PoE ports may be disabled by power management subsystem 434 so that the remaining power supply (410a) is not overloaded. The ports may be disabled entirely, or they may simply be controlled so that Ethernet communications are enabled, but no power is provided by these ports.

While it is possible that both power supplies may fail at the same time, this scenario is not illustrated in the figures because, if neither power supply can provide the necessary output voltage, none of the PoE ports can be adequately supplied with power. In the system of FIG. 4, however, the two "bad" PG signals from the power supplies would be input to XOR gate 430, causing switch 420 to remain open. The "bad" (below threshold) output voltage of each power supply would therefore be applied to the corresponding group of PoE ports.

Although the embodiments described above control the opening and closing of switch 420 based only on the output of XOR gate 430, other embodiments may also enable control of switch 420 based on user input. In some cases, for example, it may be desirable for a network device to enable a "split power plane," in which switch 420 is constrained to remain open, regardless of the PG signals from the respective power supplies. This may be desirable when a single device is connected to two different PoE ports-a first PoE port in a port group connected to a first power supply, and a second PoE port in a port group connected to a second power supply. Because the device is connected to PoE ports in two different port groups, the device will continue to receive power from one of the power supplies, even if the other of the power supplies fails.

Some embodiments may therefore include a user interface 436 that enables access to switch 420. The user may use this interface to set switch 420 to operate in either a first, power supply switched mode, or a second, split power plane mode. In the power supply switched mode, the switch is controlled by the output of XOR gate 430 (or similar control circuitry which receives input signals from the respective power supplies). In the split power plane mode, the switch remains open, regardless of any inputs received from the power supplies. In this mode, power rails 412a and 412b are never shorted to each other. Accordingly, each group of PoE port groups 414a and 414b receive power only from the corresponding one of power supplies 410a and 410b.

The operation of the system in the split power plane mode is illustrated in FIGS. 6A-6C. In FIG. 6A, operation of the system when both power supplies are generating "good" output voltages is shown. In this figure, it can be seen that current from each power supply 410 flows through the corresponding ideal diode circuit 422, through the corresponding power rail 412, and to the corresponding group 414 of PoE ports. An external device such as a WiFi access point is connected to one of the PoE ports in group 414a and one of the PoE ports in group 414b. Power is therefore provided to the external device from both power supply 410a and power supply 410b.

In FIG. 6B, power supply 410a has failed (i.e., is providing output power at a voltage less than a threshold value), and power supply 410b is operating normally, providing power at a "good" voltage (at or above the threshold). The output voltage from power supply 410a is inadequate to provide power to the external device, no current flows through the PoE port in group 414a. Power supply 410b, however, is generating power at a "good" voltage, so current flows through the PoE port in group 414b to the external device. Similarly, as depicted in FIG. 6C, when power supply 410b has failed, no current flows through the PoE port in group 414b, but power supply 410a is providing power at a "good" voltage, so current flows through the PoE port in group 414a to the external device.

The embodiments disclosed above use two power supplies. Alternative embodiments, however, may use more than two power supplies. Generally, these alternative embodiments operate using the same principles, but the components that interconnect the power supplies and corresponding power rails with each other may need to be different in order to accommodate the fact that there are more than two power supplies. For instance, if there are three power supplies, there may be multiple switched links between the corresponding power rails, each of which electrically connects a corresponding pair of the power rails when one of the associated power supplies fails. Alternatively, there may be a single link between all of the power rails which electrically connects all of the power rails when one of the power supplies fails. Similarly, the circuitry which receives the PG signals from the power supplies must accommodate the additional input signals and must be configured to provide one or more output signals to control the switched link(s) between the power rails.

Figure 7:
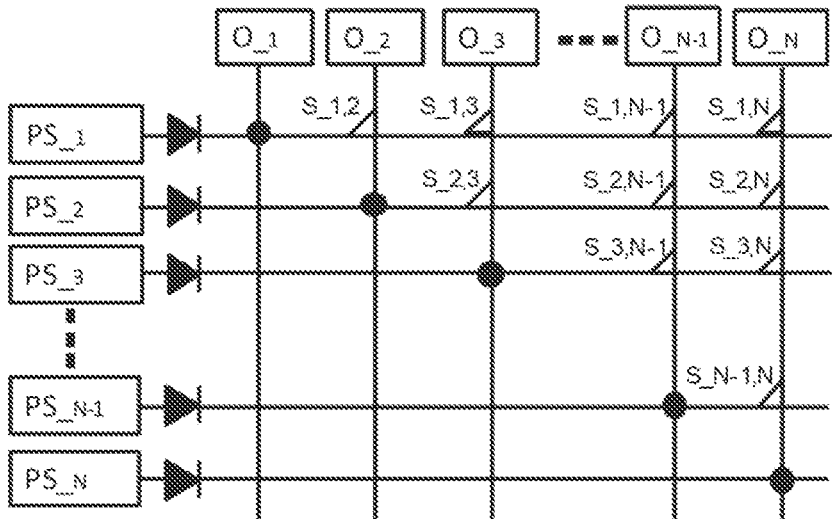
FIG. 7 is a diagram illustrating a generalized scheme for N interconnecting power supplies and N output power rails in accordance with some embodiments.

Referring to FIG. 7, a diagram is provided to illustrate a generalized scheme for the interconnections between power supplies and output power rails in a system having N power supplies (and corresponding power rails) in some embodiments. This diagram shows a matrix with N power supplies on the left side of the matrix and N output power rails at the top of the matrix.

In this example, N is the number of power supplies in the system, where N may be 2 or more. M is the number of bidirectional switches that are used to selectively interconnect the power supplies to the output power rails to form a full mesh. The number M can be determined by the equation:

$$M = N(N-1)/2$$

The switches receive N-inputs, each comprising a power supply status signal (a PG signal) from a power supply. The switches provide M outputs to individually control each switch. $S\_i,j$ is a switch that selectively connects power supply i and output power rail j.

The solid dots in the matrix represent permanent connections between corresponding power supplies and output power rails.

In this example, the switches are controlled by a hardware-based table that maps each switch connection from a power supply to an output. The table is configurable with switching policies, such as state, priority, and power budget. Based on the table configurations, whenever a power supply is lost, the load may be shared with the next designated power supply or may be turned off. As illustrated in the example embodiments above, a pseudo load sharing system with two power supplies and one switch, the table can be realized with a simple XOR gate.

Many alternative embodiments are possible. For example, one alternative embodiment comprises a network device having a first power supply connected to a first group of power ports via a first power rail and a second power supply connected to a second group of power ports via a second power rail. The first and second power supplies may comprise non-load-sharing power supplies, and the power ports may comprise PoE ports. A switched link is connected between the first power rail and the second power rail, and an output of an XOR logic gate is used to control the switched link. A first input of the XOR logic gate is connected to the first power supply to receive a first power state signal and a second input of the XOR logic gate is connected to the second power supply to receive a second power state signal.

In a pseudo load sharing mode, when the first power state signal provides a positive indication when the first power supply is providing power on the first power rail at or above a threshold voltage and the second power state signal provides a positive indication when the second power supply is providing power on the second power rail at or above the threshold voltage, the XOR logic gate controls the switched link to electrically isolate the first power rail from the second power rail. In the pseudo load sharing mode, when either the first power state signal or the second power state signal fails to provide the positive indication, the XOR logic gate controls the switched link to electrically connect the first power rail to the second power rail. The first and second power state signals may be tunable to adjust the threshold voltage. The switched link may comprise a switch connected between the first power rail and the second power rail, where the switch is tunable to adjust a timing with which the output of the XOR logic gate actuates the switch. If the switch reacts too slowly to the control signal from the XOR gate, the components connected to the power rail (including internal components as well as PoE ports), will experience a dip in the voltage of the failing power supply before the voltage from the remaining power supply is applied via the switched link. The power state signals and the switch may be tuned so that the XOR gate and switch react more quickly, preventing the connected components from experiencing an interruption of the supplied power (unless power management circuitry shuts off power to one or more of these components to avoid overloading the remaining power supply).

The network device may also include a first diode circuit connected between the first power supply and the switched link, the first diode circuit adapted to prevent current from flowing from the second power supply to the first power supply when the switched link electrically connects the first power rail to the second power rail and a second diode circuit connected between the second power supply and the switched link, the second diode circuit adapted to prevent current from flowing from the first power supply to the second power supply when the switched link electrically connects the first power rail to the second power rail. Each of the first diode circuit and the second diode circuit may be selectively operable in either a first mode or a second mode where, in the first mode, a directional portion of the diode circuit allows current to flow in a forward direction away the corresponding power supply but prevents current from flowing in a reverse direction toward the corresponding power supply, and in the second mode, the directional portion of the diode circuit is bypassed, allowing current to flow without incurring the voltage drop of the diode.

The switched link may be user-configurable to operate in the load sharing mode or in a split power plane mode, where when the switched link is in the split power plane mode, the switched link electrically isolates the first power rail from the second power rail regardless of the first power state signal and the second power state signal.

The network device may include a power manager connected to the first group of power ports and second group of ports, where the power manager is adapted to selectively prevent power from being provided to one or more power ports in the first group of power ports and second group of ports, thereby limiting an amount of power drawn from at least one of the first and second power supplies to no more than a maximum power threshold.

Another alternative embodiment comprises a method for providing pseudo load sharing in a network device. This method comprises connecting each of a plurality of power supplies to a corresponding power rail and connecting each power rail to a corresponding group of power ports, which may be PoE ports. In a pseudo load sharing mode, the method includes monitoring, for each power supply, a corresponding output voltage, where while each of the output voltages of each of the power supplies is at or above a threshold voltage, an electrical connection is maintained between each power supply with the corresponding group of power ports and isolating each power supply from the groups of power ports corresponding to other ones of the power supplies, and when the output voltages of each of one or more of the power supplies is below the threshold voltage, an electrical connection is established between the groups of power ports corresponding to the one or more of the power supplies having the output voltages below the threshold voltage and one or more of the power supplies having output voltages at or above the threshold voltage.

The method may further comprise, in response to determining that the output voltage of one of the power supplies is below the threshold voltage, isolating the ¬ one of the power supplies from all of the power ports. In some embodiments, the method may further comprise connecting, between each of the power supplies and the corresponding group of power ports, a corresponding diode circuit. The method may also comprise, for each power rail, connecting a switchable link between the power rail and at least one other power rail. The switchable link may be controlled to remain open unless the output voltage of the power supply connected to at least one of the power rails is below the threshold voltage. In a split power plane mode, the switchable link may be controlled to remain open regardless of the output voltages of the power supplies connected to the power rails.

Another alternative embodiment comprises a network device having two or more power supplies, wherein each of the power supplies is connected to a corresponding power rail. Each power supply, in an operating state, supplies a desired output voltage to the corresponding power rail and, in a failure state, does not supply the desired output voltage to the corresponding power rail. The power supply further generates a corresponding power state signal indicating whether the power supply is in the operating state or the failure state. The network device also includes a plurality of equipment groups, where each of the equipment groups is connected to a corresponding one of the power rails. The device further includes one or more switched links connected between the plurality of power rails and switch control circuitry which receives the power state signals from each of the power supplies and controls the one or more switched links based on the received power state signals. In response to receiving from a first one of the plurality of power supplies a corresponding first power state signal indicating that the first power supply is in the in the failure state, the switch control circuitry controls a first one of the switched links between a first power rail corresponding to the first power supply and a second power rail corresponding to a second one of the power supplies, thereby enabling a first one of the plurality of equipment groups connected to the first power rail to receive power from the second power supply.

The equipment groups may be connected to the corresponding power rails through corresponding PoE ports. The network device may further comprise, for each power supply, a corresponding diode circuit connected between the power supply and the corresponding switched link, where the diode circuit is adapted to prevent current from flowing to the power supply when the corresponding switched link electrically connects the power rail of the power supply to the power rail of another power supply. In the operating state, a directional portion of the diode circuit is bypassed, allowing current to flow from the power supply without the voltage drop of the diode and, in the failure state, the directional portion of the diode circuit allows current to flow in the forward direction but prevents current from flowing in the reverse direction.

In some embodiments, each switched link is user-configurable to operate in a load sharing mode or in a split power plane mode, where when the switched link is in the split power plane mode, the switched link electrically isolates the power rails between which the switched link is connected regardless of whether the power supplies connected to the power rails are in the operating state or the failure state.

It will be understood that while specific embodiments have been presented herein, these embodiments are merely illustrative, and not restrictive. Rather, the description is intended to describe illustrative embodiments, features and functions in order to provide an understanding of the embodiments without limiting the disclosure to any particularly described embodiment, feature or function, including any such embodiment feature or function described. While specific embodiments of, and examples for, the embodiments are described herein for illustrative purposes only, various equivalent modifications are possible within the spirit and scope of the disclosure, as those skilled in the relevant art will recognize and appreciate.

As indicated, these modifications may be made in light of the foregoing description of illustrated embodiments and are to be included within the spirit and scope of the disclosure. Thus, while particular embodiments are described, a latitude of modification, various changes and substitutions are intended in the foregoing disclosures, and it will be appreciated that in some instances some features of embodiments disclosed herein will be employed without a corresponding use of other features, and features described with respect to one embodiment may be combined with features of other embodiments without departing from the scope and spirit of the disclosure as set forth.

What is claimed is:

1. A network device comprising:
   a first power supply connected to a first group of power ports via a first power rail;
   a second power supply connected to a second group of power ports via a second power rail;
   a switched link connected between the first power rail and the second power rail; and
   an exclusive OR (XOR) logic gate,
      wherein an output of the XOR logic gate is connected to a control input of the switched link,
      wherein a first input of the XOR logic gate is connected to the first power supply to receive a first power state signal,
      wherein a second input of the XOR logic gate is connected to the second power supply to receive a second power state signal,
      wherein when the first power state signal provides a positive indication that the first power supply is providing power on the first power rail at or above a threshold voltage and the second power state signal provides a positive indication when the second power supply is providing power on the second power rail at or above the threshold voltage, the XOR logic gate controls the switched link to electrically isolate the first power rail from the second power rail, and wherein in a load sharing mode, when either the first power state signal or the second power state signal fails to provide the positive indication, the XOR logic gate controls the switched link to electrically connect the first power rail to the second power rail.

2. The network device of claim 1, wherein the power ports comprise power-over-ethernet (POE) ports.

3. The network device of claim 1, further comprising:

a first diode circuit connected between the first power supply and the switched link, the first diode circuit adapted to prevent current from flowing from the second power supply to the first power supply when the switched link electrically connects the first power rail to the second power rail; and a second diode circuit connected between the second power supply and the switched link, the second diode circuit adapted to prevent current from flowing from the first power supply to the second power supply when the switched link electrically connects the first power rail to the second power rail.

4. The network device of claim 3, wherein each of the first diode circuit and the second diode circuit is selectively operable in either a first mode or a second mode, wherein:

in the first mode, a directional portion of the diode circuit allows current to flow in a forward direction away from the corresponding power supply but prevents current from flowing in a reverse direction toward the corresponding power supply; and in the second mode, the directional portion of the diode circuit is bypassed, allowing current to flow in both the forward direction and the reverse direction.

5. The network device of claim 1, wherein the switched link is user-configurable to operate in the load sharing mode or in a split power plane mode, wherein when the switched link is in the split power plane mode, the switched link electrically isolates the first power rail from the second power rail regardless of the first power state signal and the second power state signal.

6. The network device of claim 1, further comprising a power manager connected to the first group of power ports and second group of power ports, the power manager adapted to selectively prevent power from being provided to one or more power ports in the first group of power ports and second group of power ports, thereby limiting an amount of power drawn from at least one of the first power supply and the second power supply to no more than a corresponding maximum power threshold.

7. The network device of claim 1, wherein the first and second power supplies comprise non-load-sharing power supplies.

8. The network device of claim 1, wherein the first power state signal and the second power state signal are tunable to adjust the threshold voltage.

9. The network device of claim 1, wherein the switched link comprises a switch connected between the first power rail and the second power rail and wherein the switch is tunable to adjust a timing with which the output of the XOR logic gate actuates the switch.

10. A network device comprising:

a plurality of power supplies, wherein each of the power supplies is connected to a corresponding power rail, in an operating state each power supply simultaneously supplies a desired output voltage to the corresponding power rail of that power supply, and when a power supply is in a failure state that power supply does not supply the desired output voltage to the corresponding power rail for that power supply, and wherein each power supply generates a corresponding power state signal indicating whether that power supply is in the operating state or the failure state;

a plurality of equipment groups, each of the equipment groups connected to a corresponding one of the power rails such that in the operating state each equipment group receives power from the power supply connected to the corresponding one of the power rails;

one or more switched links connected between the plurality of power rails, wherein each switched link is user-configurable to operate in a load sharing mode or in a split power plane mode, wherein when the switched link is in the split power plane mode, the switched link electrically isolates the power rails between which the switched link is connected regardless of whether the power supplies connected to the power rails are in the operating state or the failure state;

switch control circuitry which receives the power state signals from each of the power supplies and controls the one or more switched links based on the received power state signals, wherein in response to receiving from a first one of the plurality of power supplies a corresponding first power state signal indicating that the first power supply is in the failure state, the switch control circuitry controls a first one of the switched links between a first power rail corresponding to the first power supply and a second power rail corresponding to a second one of the power supplies, thereby enabling a first one of the plurality of equipment groups connected to the first power rail to receive power from the second power supply.

11. The network device of claim 10, wherein the equipment groups are connected to the corresponding power rails through corresponding power-over-ethernet (PoE) ports.

12. The network device of claim 10, further comprising, for each power supply:

a corresponding diode circuit connected between the power supply and the corresponding switched link, the diode circuit adapted to prevent current from flowing to the power supply when the corresponding switched link electrically connects the power rail of the power supply to the power rail of another power supply;

wherein in the operating state, a directional portion of the diode circuit is bypassed, allowing current to flow in both a forward direction away the power supply and a reverse direction toward the power supply; and wherein in the failure state, the directional portion of the diode circuit allows current to flow in the forward direction but prevents current from flowing in the reverse direction.

* * * * *